US012154426B2

(12) United States Patent
Kunze

(10) Patent No.: US 12,154,426 B2
(45) Date of Patent: Nov. 26, 2024

(54) METHOD FOR AUTOMATIC TESTING OF A FIRE ALARM SYSTEM

(71) Applicant: Siemens Schweiz AG, Zürich (CH)

(72) Inventor: Axel Kunze, Zürich (CH)

(73) Assignee: SIEMENS SCHWEIZ AG, Zurich (CH)

( * ) Notice: Subject to any disclaimer, the term of this patent is extended or adjusted under 35 U.S.C. 154(b) by 143 days.

(21) Appl. No.: 18/003,994

(22) PCT Filed: Jun. 29, 2021

(86) PCT No.: PCT/EP2021/067867

§ 371 (c)(1),
(2) Date: Dec. 30, 2022

(87) PCT Pub. No.: WO2022/002950

PCT Pub. Date: Jan. 6, 2022

(65) Prior Publication Data

US 2023/0282096 A1 Sep. 7, 2023

(30) Foreign Application Priority Data

Jul. 3, 2020 (EP) .................................... 20183865

(51) Int. Cl.
*G08B 29/04* (2006.01)

(52) U.S. Cl.
CPC .................................. *G08B 29/043* (2013.01)

(58) Field of Classification Search
CPC .................................................... G08B 29/043
USPC .......................................................... 340/577
See application file for complete search history.

(56) References Cited

U.S. PATENT DOCUMENTS

| | | | | |
|---|---|---|---|---|
| 4,506,255 A * | 3/1985 | Sasaki | G08B 29/145 340/502 |
| 5,350,019 A * | 9/1994 | Igarashi | G08B 26/001 340/584 |
| 5,705,979 A * | 1/1998 | Fierro | G08B 25/04 340/517 |
| 2002/0024435 A1* | 2/2002 | Suzuki | G08B 17/00 340/506 |
| 2007/0241875 A1* | 10/2007 | Costa | G08B 29/24 340/506 |

(Continued)

FOREIGN PATENT DOCUMENTS

| | | | |
|---|---|---|---|
| EP | 1 580 706 | 9/2005 | G08B 29/14 |
| EP | 2 500 882 | 9/2012 | G08B 17/10 |

OTHER PUBLICATIONS

Search Report for International Application No. PCT/EP2021/067867, 13 pages, Oct. 15, 2021.

*Primary Examiner* — Kerri L McNally
(74) *Attorney, Agent, or Firm* — Slayden Grubert Beard PLLC

(57) ABSTRACT

A method is specified for automatic testing of a fire alarm system. The method is carried out by a device in the fire alarm system functioning as a panel. In this method, during a recording mode, fire detectors are triggered in turn and the reactions resulting from the triggering (recording mode reactions) of the panel are stored. During a test mode executed later in time, for example as a result of a firmware update of the panel, reactions resulting during the test mode (test mode reactions) are compared with the reactions stored during the recording mode. With discrepancies or an insufficient match an error message is generated.

7 Claims, 5 Drawing Sheets

(56) References Cited

U.S. PATENT DOCUMENTS

| | | | | |
|---|---|---|---|---|
| 2012/0293334 | A1 | 11/2012 | Yu | 340/632 |
| 2014/0009279 | A1* | 1/2014 | Tsubokawa | G08B 25/14<br>340/533 |
| 2015/0302727 | A1* | 10/2015 | Piccolo, III | G08B 17/107<br>340/514 |
| 2016/0072891 | A1* | 3/2016 | Joshi | G06F 21/52<br>370/254 |
| 2016/0171857 | A1* | 6/2016 | Zumsteg | G08B 17/10<br>340/628 |
| 2021/0020021 | A1* | 1/2021 | Sahai | A62C 37/04 |

* cited by examiner

METHOD FOR AUTOMATIC TESTING OF A FIRE ALARM SYSTEM

CROSS-REFERENCE TO RELATED APPLICATIONS

This application is a U.S. National Stage Application of International Application No. PCT/EP2021/067867 filed Jun. 29, 2021, which designates the United States of America, and claims priority to EP Application No. 20183865.3 filed Jul. 3, 2020, the contents of which are hereby incorporated by reference in their entirety.

TECHNICAL FIELD

The present disclosure relates to fire alarms. Various embodiments of the teachings herein may include methods for automatic testing of a fire alarm system.

BACKGROUND

A fire alarm system comprises at least one fire detector and at least one device functioning as the central unit in the fire alarm system. These devices (fire detectors, central unit) are connected to a bus line, also referred to below as a transmission line, and are connected at least for communication via the bus line. The central unit is referred to below for short as the panel (fire alarm panel). Via the bus line—starting from the panel—data and/or energy is transmitted to the fire detectors connected to the bus line. The fire detectors connected to the bus line, the bus line itself and at least one panel connected to the bus line together form a fire alarm system or a fire alarm installation.

When firmware of the panel is updated the correct function of the panel and also of the fire alarm system as a whole must be tested again. To do this the panel was previously put into a test mode manually. Subsequently at least individual fire detectors included in the fire alarm system are triggered manually and an operator checks a respective display resulting from such a triggering arriving at the panel and displayed thereon. In some countries the manual triggering of all fire detectors included in the respective fire alarm system is necessary for this.

This test is complicated. The effort increases with the number of fire detectors to be triggered manually. Specifically, with a large number of displays to be checked, such checking by a human operator is also prone to errors.

SUMMARY

Teachings of the present disclosure include methods for automatically carrying out such a test. For example, some embodiments include a method for operating a fire alarm system (10) with a plurality of fire detectors (12) and a panel (14), wherein the plurality of fire detectors (12) is connected via a common transmission line (16) to the panel (14) at least for communication, wherein each fire detector (12), in the event of a triggering and as a result of the triggering, sends a message (20) to the panel (14), wherein as part of an automatic test triggering of a fire detector (12) the panel (14) sends a stimulus (24) to the fire detector (12) for triggering it and wherein on receipt if the stimulus (24) the triggered fire detector (12) sends a message (20) to the panel (14), wherein the message (20) is processed by the panel (14) and triggers a reaction (22) of the panel (14) to the message (20), wherein for a test of the fire alarm system (10) a predetermined or predeterminable set of fire detectors (10) is triggered, wherein the test of the fire alarm system (10) is carried out in two method sections, namely initially in a recording mode (100) and at a later point in time in a test mode (200), wherein the test mode (200) is carried out after a firmware update of the panel (14), wherein in recording mode (100), for each triggered fire detector (12) a resulting reaction (22) of the panel (14) is stored in the panel (14) in each case, wherein, in test mode (200), for each fire detector (12) triggered during the recording mode (100), the panel (14) has a respective message (20) applied to it, which is processed by the panel (14) and leads to a reaction (22) of the panel (14) to the message (20), wherein the reaction (22) stored as part of the recording mode (100) in the panel (14) and the resulting reaction (22) as part of the test mode (200) are compared, and wherein an error message (260) is generated by the panel (14) when no match or no sufficient match is determined during the comparison.

In some embodiments, in recording mode (100), for each triggered fire detector (12), a message (20) sent to the panel (14) in response to the test triggering and the resulting reaction (22) of the panel (14) to the message (20) are stored in the panel (14) in each case and in test mode (200), for each fire detector (12) triggered during the recording mode (100), the panel (14) has the message (20) stored during the recording mode (100) applied to it.

In some embodiments, in test mode (200) each fire detector (12) triggered during the recording mode (100) is triggered automatically and the automatically triggered fire detector (12) sends a message (20) to the panel (14) in response to the trigger, whereby the panel (14) has this message (20) applied to it.

In some embodiments, in test mode (200) the comparison made there of the reactions (22) stored as part of the recording mode (100) with the reactions (22) resulting in each case as part of the test mode (200) also comprises a comparison of reaction times acquired during the recording mode (100) with reaction times resulting during the test mode (200) and, with a discrepancy or a discrepancy exceeding a predetermined or predeterminable threshold value between the reaction times, an error message (260) is generated.

In some embodiments, the test mode (200) is carried out recurrently according to a predetermined or predeterminable schedule and/or after an event in the fire alarm system (10).

As another example, some embodiments include a computer program (300) with computer program instructions, which, when executed in a device of a fire alarm system (10) functioning as a panel (14), cause said device to carry out one or more of the methods as described herein.

As another example, some embodiments include a computer program product comprising commands or electronically readable control signals, which, when executed by a device in a fire alarm system (10) functioning as a panel (14), cause said device to carry out one or more of the methods as described herein.

As another example, some embodiments include an apparatus with a memory and a processing unit, which is intended and configured to function as a panel (14) in a fire alarm system (10), wherein a computer program (300) as described herein is loaded into its memory and wherein, when it is in operation, the apparatus executes the computer program.

BRIEF DESCRIPTION OF THE DRAWINGS

An exemplary embodiment of the teachings herein is explained in greater detail with the aid of the drawings.

Objects or elements corresponding to one another are provided with the same reference characters in all figures. The exemplary embodiment is not to be understood as a restriction of the scope of the disclosure. Instead, within the framework of the present disclosure, expansions and modifications are also entirely possible, in particular those that for example through combination or variation of individual features or method steps described in conjunction with the general or specific part of the description and also contained in the claims and/or the drawing, are able to be extracted for the person skilled in the art in respect of the achievement of the object and lead through combinable features to a new object or to new method steps or sequences of method steps. In the figures:

DETAILED DESCRIPTION

Figure 1:
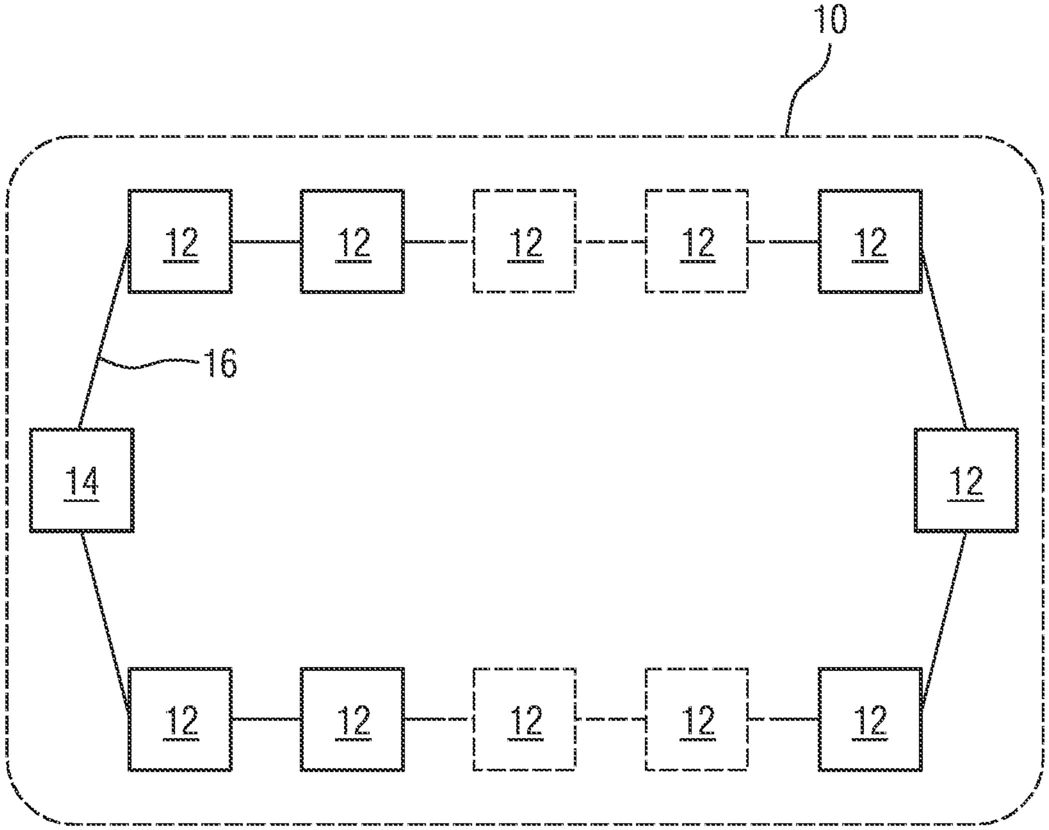
FIG 1 Prior art
FIG. 1 shows a fire alarm system with a number of fire detectors and a fire alarm panel incorporating teachings of the present disclosure.

In various methods described herein for operation of a fire alarm system and for automatically carrying out tests in the fire alarm system, in which, as its devices, the fire alarm system comprises fire detectors connected via a transmission line to the panel as well as the transmission line each fire detector, in the event of a so-called triggering and as a result of the triggering, sends a message to the panel. A triggering can occur in operation of the fire alarm system as a result of an alarm situation (fire and/or smoke). In this case the triggering involves a triggering due to fire. A manual test triggering by an operator or an automatic triggering by the panel is also possible. In each case the triggered fire detector, as a result of the triggering, sends a message to the panel. The automatic test triggering of a fire detector by the panel occurs by the panel sending a stimulus to the fire detector. A stimulus is thus the event that is created in the panel and output in order to trigger a test alarm for a fire detector. In the ideal case such a stimulus is a field bus telegram.

A message received by the panel and present there is processed by the panel and triggers a reaction of the panel to the message. For testing the fire alarm system a predetermined or predeterminable set of fire detectors are triggered. The testing of fire alarm system takes place in two modes, namely initially in a recording mode and at a later time in a test mode.

In recording mode, for each triggered fire detector, at least one resulting reaction of the panel is stored in each case, especially in the panel. The test triggering of the fire detector can be carried out manually or automatically. Accompanying differences are described below.

In test mode, for each fire detector triggered during the recording mode, the panel has a respective message applied to it. The panel has a message applied to it in that the panel receives a message from a fire detector or a message is created in the panel. The panel does not make a distinction between a message received from a remote alarm or an internally created message and processes each message that it has applied to it in the same way. The processing of the message by the panel leads to a reaction of the panel to the message. A reaction is for example the output of a text and/or the activation of at least one output, the latter for example to activate an alarm connected to the panel. The test output as a reaction can for example comprise a location text, such as e.g. «HFM 308 Liftlobby», «427 men's WC», «copier room», «photo workshop building GG suspended ceiling», or an alarm group number, such as e.g. 41011/1 or 203/2. The period of time between the application of a stimulus and the receipt of a reaction by the panel in each case usually lies in a range of 100 ms to 10 seconds, typically in a range of a few 100 ms to seconds.

In test mode, the reaction stored as part of the recording mode and the reaction resulting as part of the test mode are compared. An error message is displayed by the panel when the comparison does not establish a match or a sufficient match. In other words an error message is created and output by the panel when no match or no sufficient match is established during the comparison. The error message can be output directly on the panel and/or at a control center connected to the panel for data communication or signaling.

The test mode is carried out after a firmware update of the panel, in particular automatically after a firmware update. The carrying out of the test mode after a firmware update can basically be triggered manually, for example by an operator of the fire alarm system and by actuation of an operating element provided for the purpose. In addition or as an alternative there can be provision for the carrying out of the test mode after a firmware update to be triggered automatically. For this a signal is triggered by a software functionality monitoring the firmware update, which is evaluated for automatically starting the test mode.

After a firmware update of the panel, the possibility exists of a malfunction or of a function deviating from the situation before the firmware update. By the test mode being carried out after such a firmware update, in particular automatically after a firmware update, to a certain extent a "behavior" of the panel before the firmware update is compared to the "behavior" of the panel after the firmware update. If no differences come to light as part of the comparison it can then be assumed that the panel functions in the same way after the firmware update as it did before it.

By means of a comparison a check is made as to whether the panel, at the time at which the test mode is running, is still reacting in the same way as at the time at which the recording mode was carried out. By means of the comparison the function of the panel after a firmware update can be tested for example. A corresponding test of the fire alarm system by an operator previously needed is no longer necessary and errors that can never be excluded during such testing by an operator are now avoided.

In some embodiments, there may be an actual activation of outputs while the method proposed here is being carried out, i.e. in recording mode and in test mode, to be disabled. When the reactions are compared (reaction recorded during the recording mode; reaction resulting during the test mode) with a disabled triggering of the outputs it is not the activation states of the outputs but internal states that are compared. These internal states involve the contents of memory cells, as a result of which in normal operation there is an activation of outputs.

For the description presented here, for avoidance of unnecessary repetitions, it is true to say that features and details that are described in conjunction with the said method for operating a fire alarm system and also possible embodiments naturally also apply in conjunction with and in respect of the apparatus configured for carrying out the method, i.e. in particular a panel of a fire alarm system, and vice versa. Accordingly the method can also be developed by means of individual or by a number of method features that relate to corresponding method steps carried out by a corresponding apparatus, and the apparatus can also be developed by means for carrying out of method steps carried out as part of the method. Consequently features and details that are described in conjunction with the physical method, naturally also apply in conjunction with and in respect of the apparatus specified for carrying out the method and vice versa in each case, so that mutual reference is or can always be made with regard to the disclosure.

References used within the claims point to the further embodiment of the subject matter of the claim taken into account by the features of the respective claim in each case. They are not to be understood as dispensing with achieving an independent, physical connection for the features or combinations of features of a dependent claim. Furthermore, in respect of a laying out of the claims as well as the description for a more detailed concretization of a feature in a dependent claim it is assumed that such a restriction in the respective preceding claims and also a more general form of embodiment of the physical method is not present. Each reference in the description to aspects of dependent claims is thus to be read, unless specifically stated, expressly as a description of optional features.

In some embodiments, a message sent to the panel in response to a triggering and the resulting reaction of the panel to the message in each case are stored (both at the panel) in recording mode for each triggered fire detector. In test mode the panel has the message stored during the recording mode applied to it for each fire detector triggered during the recording mode, i.e. the stored message is created in the panel (loaded into a corresponding memory area) as if it were to have been received from an external source. As a result this message is applied to the panel. The application of the message leads to a processing of the message by the panel and also to a reaction of the panel to the message.

In some embodiments, the panel processes the same message during the test mode as during the recording mode. On comparison of the resulting reactions in each case (reaction resulting and stored during the recording mode; reaction resulting during the test mode) it is tested whether the panel is still behaving in the test mode in the same way as it did before during the recording mode.

In some embodiments, in the test mode each fire detector triggered during the recording mode is triggered automatically, namely by the panel. In this variant no stored messages are used during the test mode, but new messages are created by automatic triggering of the fire detector. Each automatically triggered fire detector sends a message to the panel in response to the triggering. This message is applied to the panel thereby. The application with the message leads to a processing of the message by the panel and also to a reaction of the panel to the message. The reaction resulting during the test mode is finally compared with the reaction recorded during the recording mode.

In some embodiments, in the comparison of the respective resulting reactions (reaction resulting and stored during the recording mode; reaction resulting during the test mode) it is also checked whether the panel still behaves in the test mode as it did before during the recording mode. As a result of the triggering of the fire detector in the test mode too, the testing here also detects the function of the fire detector and the transmission line however.

In some embodiments, in test mode the comparison there of the reactions stored as part of the recording mode with the reactions resulting in each case as part of the test mode also comprises a comparison during the recording mode of reaction times detected with reaction times resulting during the test mode. The reaction time in each case is the time between the application of a message to the panel and the reaction of the panel to the message. An error message occurs with a deviation or a deviation exceeding a predetermined or predeterminable threshold value between the reaction times.

In some embodiments, the recording mode and/or the test mode are carried out recurrently according to a predetermined or predeterminable schedule and/or after an event in the fire alarm system. This recurrent carrying-out is considered both only for the recording mode and also only for the test mode as well as for the recording mode on the one hand and for the test mode on the other hand. When only the recording mode is carried out recurrently this guarantees that when the test mode is carried out (then for the first time) the most up-to-date data for the comparison carried out as part of the test mode is then available. When only the test mode is carried out recurrently the comparison taking place as part of the test mode is carried out a number of times and thus allows any possible changes in the fire alarm system to be discovered that have occurred during two points at which the test mode was carried out. When the recording mode and also the test mode are carried out recurrently, the advantages outlined above are combined. Then, for the comparison taking place as part of the test mode, the data recorded as part of the last recording mode carried out is used in each case.

In some embodiments, the method is realized for automatic execution in the form of a computer program. The computer program is an implementation of the physical method for operation of a fire alarm system and for carrying out tests in the fire alarm system. When method steps or method step sequences are described below, this relates to actions that take place due to the computer program or under the control of the computer program where it is not explicitly specified that individual actions are brought about by a user of the computer program. Each use of the term "automatically" at least means that the action concerned occurs because of the computer program or under control of the computer program.

Instead of a computer program with individual program code instructions, the method described here and below can also be implemented in the form of firmware. It is clear to the person skilled in the art that instead of an implementation of a method in software, an implementation in firmware or in firmware and software or in firmware and hardware is always possible. There it should be true to say for the description presented that the term software or the term computer program also encompasses other implementation options, namely in particular an implementation in firmware or in firmware and software or in firmware and hardware.

The respective apparatus, in particular the panel, for carrying out the methods described herein comprises a processing unit in the form of or as a type of microprocessor as well as a memory, in which an implementation of the method in software is stored or an implementation in software and firmware is stored or embedded. During operation of the panel this carries out the method, in a first commissioning of the recording mode and in a firmware update for example, by the test mode being executed.

The diagram in FIG. 1 shows a fire alarm system 10 incorporating teachings of the present disclosure in a greatly simplified schematic manner. This comprises a plurality of fire detectors 12, at least one panel 14 and one transmission line 16. The devices included in the fire alarm system 10 (fire detector 12, panel 14) are connected to the transmission line 16. By way of example—but not necessarily—the transmission line 16 involves a ring line.

The schematically simplified diagram in FIG. 1 is also only to be understood as being by way of example in respect of the number of devices shown. Real fire alarm systems 10 comprise markedly more than the fire detectors 12 shown, for example twenty fire detectors 12, fifty fire detectors 12, one hundred fire detectors 12 or more, and/or precisely one panel 14 or more than one panel 14. The fire detectors 12 shown with a dashed outline are intended to represent basically any given number of fire detectors 12. Moreover it is in no way a matter of the number of fire detectors 12 included in the fire alarm system 10. The method proposed here is suitable for a fire alarm system 10 with few fire detectors 12, for example one fire alarm system 10 with up to ten fire detectors 12, and for fire alarm systems 10 with up to one hundred fire detectors 12 and more. Likewise it is not a matter of the number of panels 14 included in the fire alarm system 10. The method proposed here is carried out by a device functioning as a panel 14 in the fire alarm system 10. Precisely one panel 14 included in the fire alarm system 10 is thus sufficient.

On a triggering of a fire detector 12 said unit sends—via the transmission line 16—a telegram (a data frame) to the panel 14, which, to distinguish it from other telegrams, is referred to as a message 20. This is shown in the diagram in FIG. 2 in a likewise schematically greatly simplified manner for an individual fire detector 12 as the origin of the message 20 and the panel 14 as the recipient of the message 20.

On the panel 14 side the receipt of the message 20 from a fire detector 12 triggers processing of the message 20 and a reaction 22 (reaction of the panel 14 to the received message 20) resulting because of the processing. In the diagram in FIG. 2 a reaction 22 is only shown schematically greatly simplified. A reaction 22 comprises for example the output of a text by means of a display unit (not shown) included in the panel 14 or assigned to the panel 14 and/or an activation of at least one output of the panel 14, namely for example an output connected to an alarm generator (not shown).

For testing the fire alarm system 10, for example after a firmware update of the panel 14, previously at least individual fire detectors 12 are triggered manually. These then each send a message 20 to the panel 14 and the receipt of such a message 20 triggers the processing of the message 20 there and the reaction 22 to the message 20. An operator checks the reaction 22 of the panel 14, in particular the operator checks whether the reaction 22 matches the triggered fire detector 12, i.e. for example whether a text matching the triggered fire detector 12 is displayed and/or whether the outputs provided for the triggered fire detector 12 (at least one output) are activated.

Such a test is automated according to the approach proposed here. The test comprises—at least in specific forms of embodiment—an automatic triggering of at least individual fire detectors 12. An automatic triggering brings about a state as in the event of an alarm situation on the triggered fire detector 12 side, i.e. for example as in the event of a strong smoke or heat effect.

Figure 2:
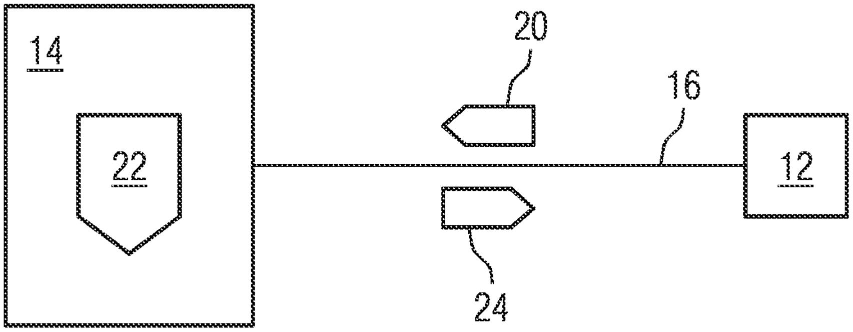
FIG 2 Prior art
FIG. 2 shows a transfer of a message from a fire detector to the panel in the event of a triggering of the fire detector and also an automatic triggering of a fire detector by sending out of a stimulus to the fire detector and by the message sent out as a result of the stimulus.

Such an automatic triggering is initiated by the panel 14. In this case the panel 14 sends via the transmission line 16 a telegram referred to as a stimulus 24 to distinguish it from the message 20. The stimulus 24 is received and processed by at least one fire detector 12 and in response to the receipt of the stimulus 24 the fire detector 12 concerned sends the message 20 already described above to the panel 14. This message 20 too is processed by the panel 14 and leads to a reaction 22 of the panel 14 to the message 20. Also shown in the diagram in FIG. 2 is the stimulus 24 sent via die transmission line 16 for such an automatic triggering.

Figure 4:
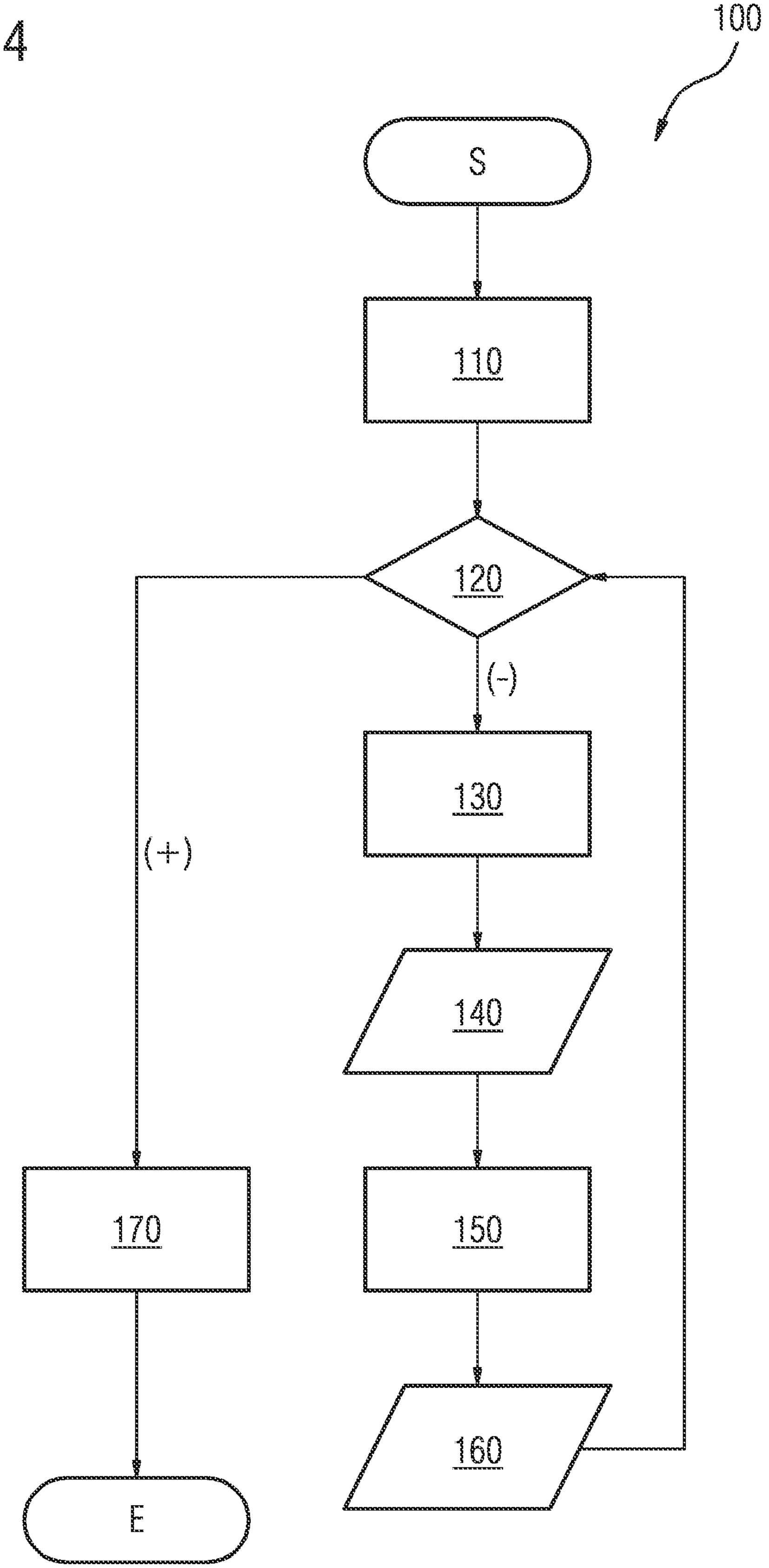
FIG. 4 shows a flow diagram for a recording mode incorporating teachings of the present disclosure.
Figure 5:
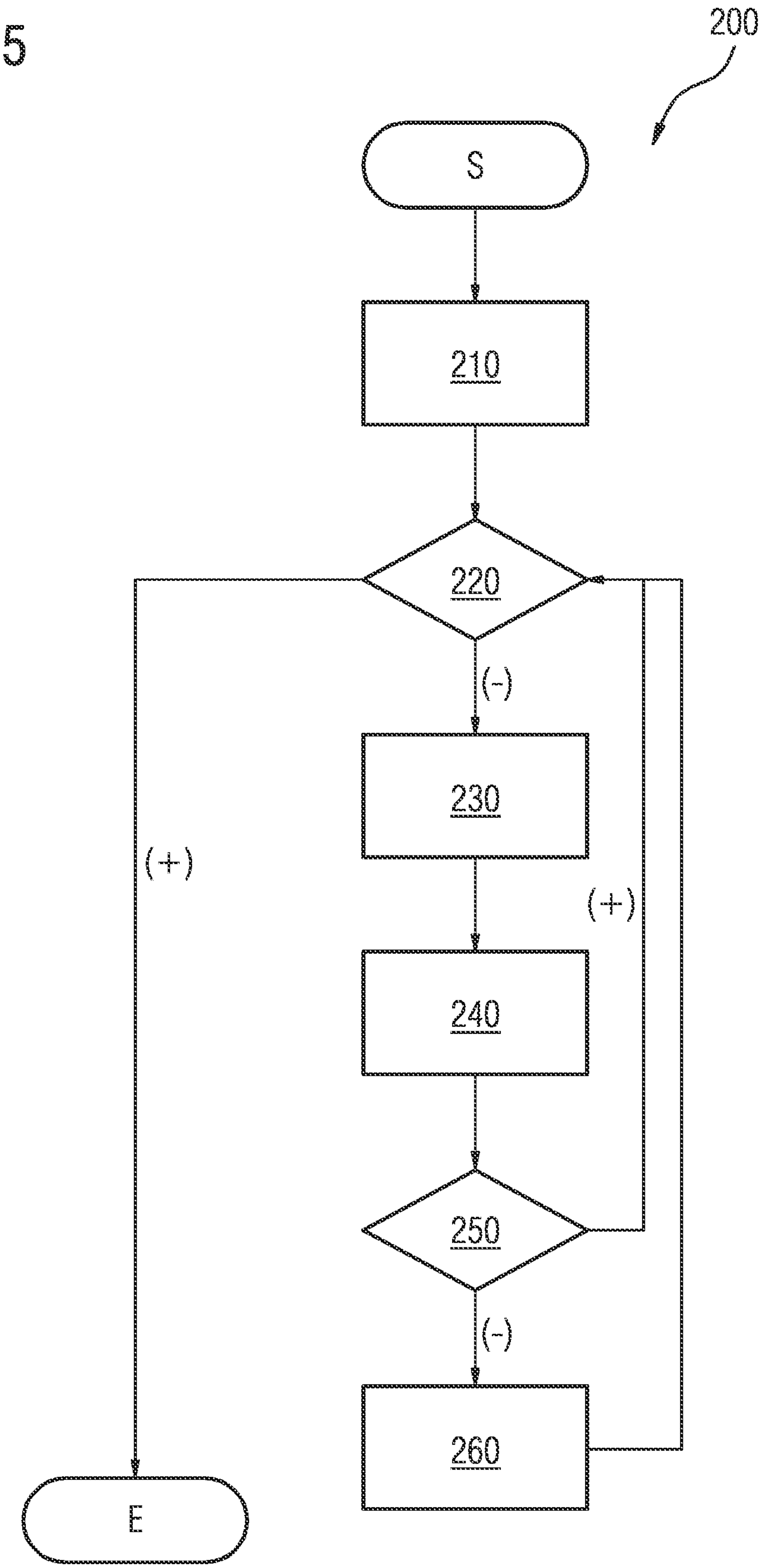
FIG. 5 shows a flow diagram for a test mode incorporating teachings of the present disclosure.

In some embodiments, the method comprises two modes or method sections, namely a recording mode 100 (FIG. 4) and a test mode 200 (FIG. 5). The recording mode 100 necessarily precedes the test mode 200 as part of the method.

Accordingly the recording mode 100 is also explained first here. As part of the recording mode 100 predetermined or predeterminable fire detectors 12 of the fire alarm system 10 are triggered, namely triggered manually or automatically in the recording mode 100 and triggered automatically in the test mode 200 at least in a specific form of embodiment of the method. Where there is an automatic triggering of the fire detector 12, this is carried out as described above. Where there is a manual triggering of the fire detector 12 this is carried out with basically known means directly at the respective fire detector 12, for example by means of an alarm tester and/or by means of test gas.

With a manual triggering of the fire detector 12 in recording mode 100 the manually triggered fire detectors 12 are the predetermined or predeterminable fire detectors 12 mentioned above. The operator carrying out the manual triggering triggers all fire detectors 12 included in the fire alarm system 10 or only individual fire detectors 12 for example. In the case of a triggering of individual fire detectors 12 the operator triggers these for example on the basis of the fire alarm forming part of a specific group (location, type or the like), by virtue of their experience or on the basis of a list available to them.

With an automatic triggering this is undertaken by the panel 14.

The predetermined or predeterminable fire detectors 12 here also involve all fire detectors 12 included in the fire alarm system 10 for example. The information about all fire detectors 12 included in the fire alarm system 10 is available to the panel 14 in the form of the configuration of the fire alarm system 10 as well as corresponding configuration data. In some embodiments, the predetermined or predeterminable fire detectors 12 involve a group of fire detectors 12, namely a subset of all the fire detectors 12 included in the fire alarm system 10. This subset—or where necessary also a number of different subsets—can be fixed (predetermined) and for example comprise all fire detectors 12 of a specific type or the fire detectors 12 included in the subset or by each subset are selected by a person (predeterminable), for example an operator of the respective fire alarm system 10.

Figure 3:
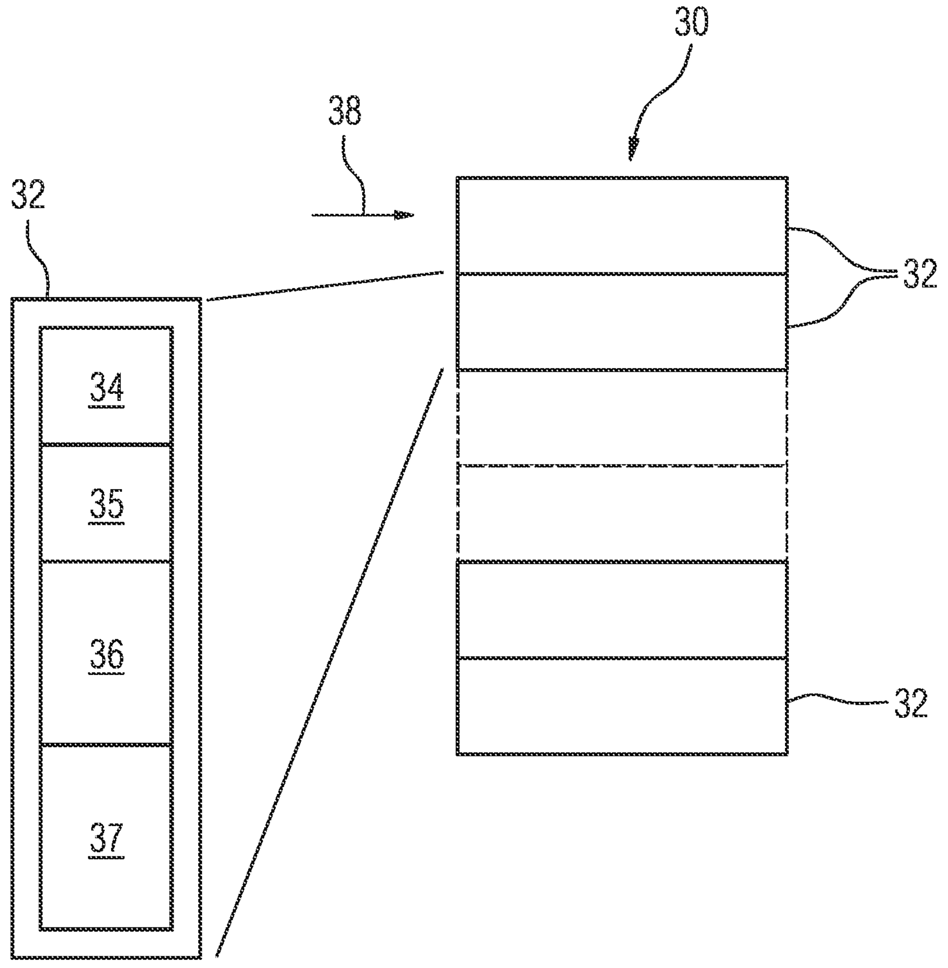
FIG. 3 shows a data structure (list of fire detectors) incorporating teachings of the present disclosure.

The diagram in FIG. 3 shows in a simplified schematic form a data structure referred to below as a fire detector list 30 with a plurality of fire detector data records 32, namely one fire detector data record 32 for each fire detector 12. With a manual triggering of the fire detector 12 during the recording mode 100 the fire detector list 30 arises as a result of the manual triggering of the fire detector 12. With an automatic triggering of the fire detector 12 during the recording mode 100 the fire detector list 30 is already the basis for the automatic triggering and is produced because of the configuration data mentioned above.

The type of fire detector list 30 and the scope of a fire detector data record 32 are dependent on a respective implementation of the method proposed here.

The further description relates by way of example to precisely one implementation option and in this regard the details explained are to be seen as completely optional. In some embodiments, the fire detector list 30 is implemented in the form of a list (data structure) and each fire detector data record 32 comprises a fire detector identification 34, an optional flag 35, a message section 36 and a reaction section 37. In some embodiments, the fire detector identification 34 is or comprises an address (bus address) or the like uniquely identifying the fire detector 12 on the transmission line 16. By means of a data item referencing precisely one fire detector data record 32 in each case, for example by means of what is known as a pointer 38, a position within the fire detector list 30 is designated.

In some embodiments, the fire detector list 30 is the basis for a optional automatic activation of the fire detector 12 as part of the recording mode 100 or an automatic activation of the fire detector 12 as part of the recording mode 100 and also as part of the test mode 200. When the fire detector data records 32 included in the fire detector list 30 each have a flag 35, it is able to be detected/predetermined by means of the flag 35 whether or not the fire detector 12 concerned is triggered as part of the automatic triggering. When an automatic triggering of the fire detector 12 is provided and when all fire detectors 12 included in the fire alarm system 10 are automatically triggered, a flag 35 (or an evaluation of such a flag 35) is unnecessary.

An example recording mode 100 is shown in the diagram in FIG. 4 in the form of a flow diagram. In this diagram after the start ("S") of the recording mode 100, subsequent to an initialization 110, there is a check 120 as to whether all fire detectors 12 are tested.

Immediately after the start of the recording mode 100 the tested condition is naturally not yet fulfilled and a branch is made into the corresponding execution sequence area (branch with the marking "(–)", wherein "(–)" stands for the non-fulfilled condition). There the triggering 130 of a fire detector 12 takes place (either manually or automatically). With a manual triggering 130, as a result of the triggering 130, a fire detector data record 32 is produced in the fire detector list 30 in each case, i.e. as a result of the triggering 130 the panel 14 receives a message 20 from the triggered fire detector 12 and as a result of the message 20 a new fire detector data record 32, initially empty or initialized with start values, is created. In this, as a fire detector identification 34 for example, a corresponding data item received as part of the message 20 from the triggered fire detector 12 (for example the bus address) is stored. With an automatic triggering 130 this is carried out as a result of a fire detector data record 32 already existing in the fire detector list 30 (as a result of the configuration data), namely by sending a stimulus 24 to the or for the fire detector 12 designated in the respective fire detector data record 32 by means of the fire detector identification 34 in said record.

Regardless of the type of triggering 130 (manual or automatic), the triggered fire detector 12 reacts in each with a message 20 transmitted via the transmission line 16, which is received and processed by the panel 14. The message 20, optionally the message 20 and a time value for receipt of the message 20, is or are recorded (at the panel 14). This is carried out in recording mode 100 as part of a message recording 140. The processing of the message 20 by the panel 14 after a certain time triggers a reaction 22 to the message 20 (panel reaction 150). The reaction 22, optionally the reaction 22 together with a time value for the triggering of the reaction 22 by the panel 14, is or are recorded (at the panel 14). This further recording is carried out in recording mode 100 as part of recording a reaction 160. The algorithm then returns to the testing 120 already mentioned at the outset.

For as long as the condition tested there is not yet fulfilled, thus for as long all fire detectors 12 are not yet tested, the execution sequence described above (triggering 130 of a fire detector 12; receipt of a message 20 from the triggered fire detector 12 in each case; creation of a reaction 22 to the receipt of the message 20 by the panel 14) is repeated. With a manual triggering 130 of the fire detector 12 the next fire detector 12 is given as a result of the action of the operator. With an automatic triggering 130 of the fire detector 12 the next fire detector 12 is given by the fire detector list 30. With an automatic triggering 130 of the fire detector 12 there is a wait for a waiting time to elapse, i.e. for a predetermined or predeterminable period of time to elapse between the triggering 130 of a fire detector 12 and of the next fire detector 12 as part of the method and as a subfunctionality (not shown) in recording mode 100. With a manual triggering 130 of the fire detector 12 such a time gap between the triggering 130 of a fire detector 12 and that of a next fire detector 12 is produced because of the need for the operator to look for the next fire detector 12.

With an automatic triggering 130 of the fire detector 12, the detectors are tested 120 on the basis of the fire detector list 30. With a manual triggering 130 of the fire detector 12 the detectors are tested 120 on the basis of the configuration data (when all fire detectors 12*e* included in the fire alarm system 10 have been manually triggered, the condition evaluated as part of the testing 120 is fulfilled) or as a result of an evaluation of an operating action at the panel 14 (when it is signaled to the panel 14 by means of the operating action that no further fire detectors 12 will be triggered manually, the condition evaluated as part of the testing 120 is fulfilled.

When the testing 120 leads to the result "all fire detectors 12 tested" or "all intended fire detectors 12 tested" (branch with the marking "(+)", wherein "(+)" stands for the condition being fulfilled), optionally all incoming messages 20 received as part of the recording mode 100 and the respective resulting reactions 22 are stored in pairs. At least the resulting reactions 22 are stored in each case. This storage 170 is undertaken in the form of embodiment shown at the end of the recording mode 100 and thus the recording mode 100 is ended ("E").

Instead of storage 170 at the end of the recording mode 100 a successive storage during the execution sequence of the recording mode 100 comes into consideration. Then, for each message recording 140 and each reaction recording 160, the respective message 20 and the respective resulting reaction 22 (or the message 20 and a time value for receipt of the message 20, in particular an absolute or relative receipt time, as well as the reaction 22 and a time value for creating the reaction 22, in particular an absolute or relative reaction time) are stored immediately. This complete storage of all data is also optional. With successive storage at least the respective reaction 22 for each reaction recording 160 is stored.

The fire detector list 30 is considered as a location for this storage (either the storage 170 at the end of the recording mode 100 or the storage during the recording mode 100 and as part of the message recording 140 and also the reaction recording 160 or the storage during the recording mode 100 and as part of the reaction recording 160), namely the message section 36 (or the received message 20, provided this is stored) and the reaction section 37 (for the resulting reaction 22) of the fire detector data record 32 representing the respective fire detector 12 in said list.

In some embodiments, an acquisition and storage merely of the periods of time (reaction times) lying between these points in time comes into consideration instead of an acquisition and storage of absolute or relative receive times and also absolute or relative reaction times. The reaction times are each stored for example in the form of reaction time data (reaction time data item) in the reaction section 37. Such reaction times are acquired for example by starting a counter at the receive time and stopping the counter at the reaction time. The reaction time data item comprises either a directly acquired reaction time or the basis for a determination of the reaction time, namely a time of the receipt and a time of the reaction in each case.

The method section referred to here as the recording mode 100 is executed once, for example in conjunction with the commissioning of the fire alarm system 10, or repeatedly. For a repeated execution an execution after an event in the fire alarm system 10, for example a replacement of at least one fire detector 12 and a corresponding resulting change of the configuration of the fire alarm system 10, or generally an execution after each change of the configuration of the fire alarm system 10 comes into consideration. In addition or as an alternative a recurrent execution according to a predetermined or predeterminable schedule comes into consideration for a repeated execution. Optionally, with a repeated execution of the recording mode 100 as a result of a configuration change only those fire detector data records 32 are updated that are affected by the configuration change.

The method section referred to as the test mode 200 (FIG. 5) is based on a recording mode 100 being carried out at least once, then, as part of the test mode 200, data recorded previously as part of the recording mode 100 is used.

One example of the test mode 200 is shown in the diagram in FIG. 5—similarly to the corresponding diagram of the recording mode 100 in FIG. 4—in the form of a flow diagram. In test mode 200 the fire detector list 30 arising or used as part of the recording mode 100 and the data stored in said list are used. In the test mode 200—in a very similar way to that in the recording mode 100—after the start ("S") subsequently to an initialization 210, a check 220 (initial check 220) is carried out to determine whether all fire detectors 12 are tested. This check 220 is carried out with the aid of the fire detector list 30. A pointer 38 initially points (as a result of the initialization 210) to the first fire detector data record 32 of the fire detector list 30 and during the course of the test mode 200, starting from the currently designated fire detector data record 32 in each case, is shifted to the next fire detector data record 32 of the fire detector list 30. The check 220 as to whether all fire detectors 12 are tested can thus take place for example, and in a manner basically known per se, with the aid of the position of the pointer 38.

Immediately after the start of the test mode 200 the tested condition is not fulfilled and a branch is made into the corresponding area of the execution sequence (branch with the marking "(–)"). There (automatically by the panel 14) a message is created 230. The message creation 230 can comprise the automatic triggering of a fire detector 12, namely the automatic triggering of that fire detector 12 according to fire detector data record 32 designated in each case by the pointer 38. The automatically triggered fire detector 12 then creates and sends the message 20 and the message 20 arrives at the panel 14 (the panel 14 has the message 20 applied to it), it is processed there and triggers the respective reaction 22 there. The message creation 230 is also possible without triggering a fire detector 12. Then, as message creation 230, the message 20 (message section 36 of the respective fire detector data record 32) stored as part of the recording mode 100 is generated in a manner so that said message is processed at the panel 14 like a message 20 sent out by a triggered fire detector 12 (the panel 14 has the message 20 applied to it), so that a reaction 22 is also triggered to such a message 20 in each case.

The resulting response to the message 20 (arriving from a triggered fire detector 12 at the panel 14 or created in the panel 14) after a certain time and as a result of a reaction being created 240, is a reaction 22 of the panel 14. This is then (reaction check 250) checked with regard to the reaction 22 recorded as part of the recording mode 100 (reaction recording 160). A check is thus made as to whether the reaction 22 recorded during the recording mode 100 (reaction section 37 of the respective fire detector data record 32) matches the reaction 22 resulting during the test mode 200 or is at least a sufficient match.

For the case in which the test mode 200 also comprises the automatic triggering of the fire detector 12, the reaction check 250 can also comprise checking the respective messages 20, namely a comparison of the message 20 (message section 36 of the respective fire detector data record 32) recorded during the recording mode 100 in response to the triggering there of the fire detector 12 with the message 20 resulting during the test mode 200 once again in response to the triggering there of the fire detector 12. Such a check is also made for a match or at least a sufficient match.

When, as part of this reaction checking 250, a match or a sufficient match is established, the method branches to the initial check 220 (branch with the marking "(+)"). For this fire detector 12 the checking is thus successfully concluded. When, as part of this reaction checking 250, on the other hand no match or no sufficient match is established, there is an error message 260 (via the branch with the marking "(–)"). As part of the error message 260 there is a display, for example on a display unit included in the panel 14 or assigned to the panel 14, and/or a logging, for example in a memory included in the panel 14 and/or a memory linked for communication with the panel 14. The display and/or the logging comprises for example the respective fire detector 12, the fire detector identification 34 from the fire detector list 30 and/or the reaction 22 recorded as part of the recording mode 100 (from the reaction section 37 from the fire detector list 30) and the resulting reaction 22 or parts of the recorded and resulting reaction 22 recorded as part of the test mode 200. After the error message 260 the method branches to the initial check 220.

As long as the condition checked there is not yet fulfilled, i.e. as long as all fire detectors 12 are not yet tested, the execution sequence previously described (application of a message to the panel 14; processing of the message 20 by the panel 14; generation of a reaction 22 to the message 20 by the panel 14; comparison of the reaction 22 with a reaction 22 stored during the recording mode 100) is repeated with the next fire detector 12 in the fire detector list 30 in each case. When the fire detector list 30 is completely processed, the test mode 200 is ended ("E") and the end of the test mode 200 is reached via the branch with the marking "(+)".

Provided a reaction time data item has also been acquired and stored during the recording mode 100 for each triggered fire detector 12, in a particular form of embodiment of the method there is provision as part of the reaction checking 250, for the reaction times also to be checked, namely by comparison of the reaction time acquired during the recording mode 100 and the reaction times resulting during the test mode 200. With a discrepancy or a discrepancy exceeding a predetermined or predeterminable threshold value there is then likewise an error message 260. As part of the test mode 200 a particular storage of the reaction times produced there is not necessary. With the entry or the creation of the message 20—just as already previously described—a counter is started there and stopped again with the triggering of the reaction 22 (reaction creation 240). The resulting counter state corresponds to the period of time needed for the comparison.

Figure 6:
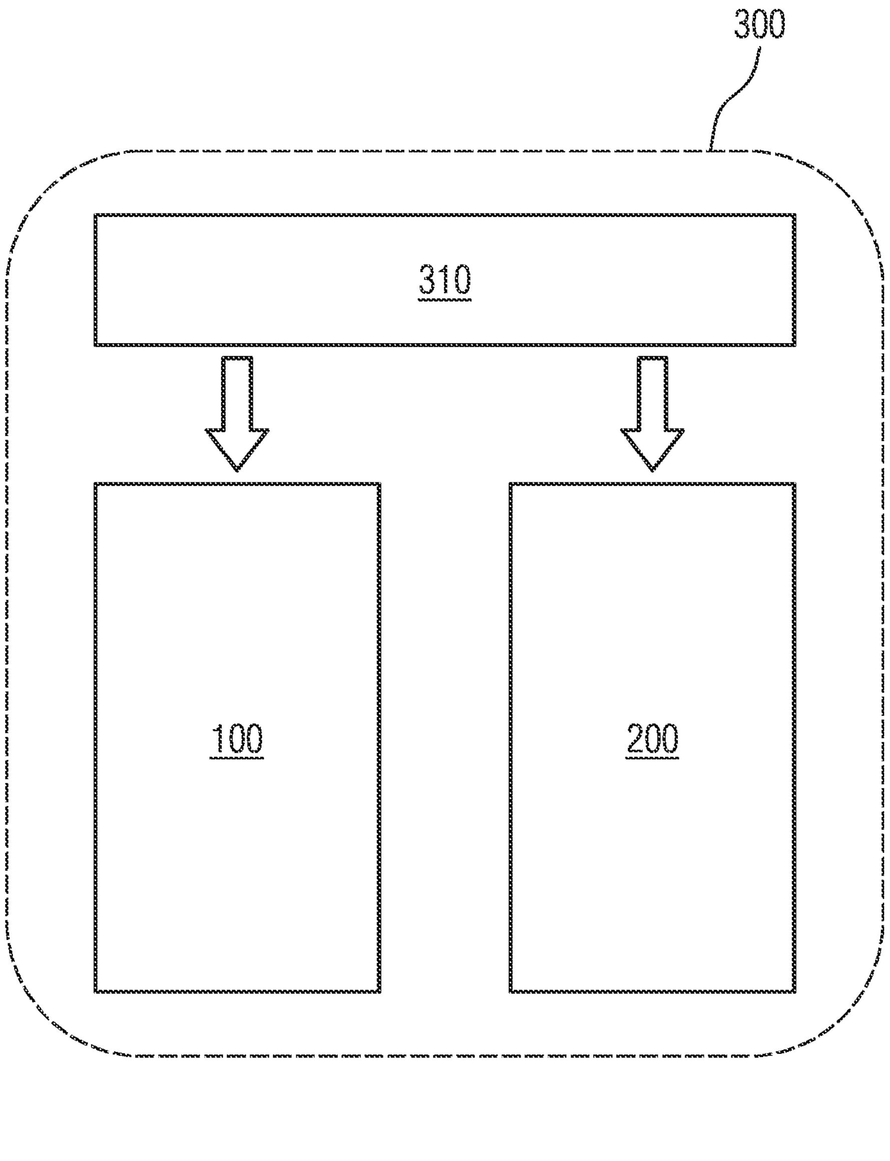
FIG. 6 shows a simplified schematic diagram of a computer program incorporating teachings of the present disclosure.

Finally, the diagram in FIG. 6 shows, in a schematically simplified form, a computer program 300 as an example for an implementation of the method proposed here. The computer program 300 is loaded into a memory (not shown) of a device in a fire alarm system 10 functioning as a panel 14. The panel 14 comprises a processing unit in the form of or as a type of microprocessor (not shown) and the computer program 300 is executed during operation of the panel 14 by means of the processing unit.

The computer program 300 comprises program code instructions with an implementation of the recording mode 100 as well as program code instructions with an implementation of the test mode 200. The recording mode 100 and the test mode 200 are started automatically by means of an activation routine 310 included in the computer program 300. The recording mode 100 is started for example as a result of an operating action able to be detected by the activation routine 310. Such an operating action at the device, for example pressing a key, is undertaken for example by an operator of the fire alarm system 10, for example on conclusion of a commissioning of the fire alarm system 10. The test mode 200 is started when the recording mode 100 has been executed at least once beforehand and firmware of the respective device (i.e. the panel 14) has been updated (firmware update). For this the activation routine 310 automatically recognized the conclusion of such an update or the activation routine 310 receives a corresponding signal in connection with the conclusion of such an update. Optionally the test mode 200 can moreover be called—when the recording mode 100 has been executed at least one beforehand—according to a schedule at predetermined or predeterminable points in time or is able to be started—when the recording mode 100 has been executed at least one beforehand—by an operating action. To this extent the activation routine 310 checks corresponding call criteria, for example call times and/or call conditions.

Although the teachings herein have been illustrated and described in greater detail by the exemplary embodiment, the scope of the disclosure is not restricted by the disclosed examples and other variations can be derived herefrom by the person skilled in the art without departing from the scope of protection thereof.

What is claimed is:

1. A method for operating a fire alarm system with a plurality of fire detectors connected via a common transmission line to a panel, the method comprising:

sending a stimulus from the panel to each fire detector to trigger the respective fire detector;

sending a message from each fire detector to the panel in response to the stimulus;

processing the message at the panel to trigger a reaction of the panel;

wherein a test of the fire alarm system includes triggering a first set of the plurality fire detectors in two separate modes, first in a recording mode and later in a test mode, wherein the test mode is carried out after a firmware update of the panel;

wherein in recording mode, for each fire detector in the first set, the resulting reaction of the panel is stored in the panel;

after conducting the test mode, for each fire detector in the first set, comparing the respective stored reaction and the resulting test mode reaction; and generating an error message at the panel if no match or no sufficient match is determined during the comparison.

2. The method as claimed in claim 1, wherein:

in recording mode, for each fire detector of the first set, the panel stores the respective message sent to the panel in response to the test triggering and the respective reaction of the panel; and in test mode, for each fire detector of the first set, the panel applies the message stored during the recording mode.

3. The method as claimed in claim 1, wherein, in test mode, the respective fire detectors are triggered automatically.

4. The method as claimed in claim 1, further comprising:

storing the comparison of the reactions as part of the recording mode with the reactions resulting in each case as part of the test mode also comprises a comparison of reaction times acquired during the recording mode with reaction times resulting during the test mode; and generating an error message if a discrepancy exceeds a predetermined threshold value.

5. The method as claimed in claim 1, further comprising carrying out the test mode recurrently according to a predetermined schedule and/or after an event in the fire alarm system.

6. A computer program product stored in a non-transitory memory, the product comprising commands or electronically readable control signals, which, when executed by a panel in a fire alarm system, cause the panel to:

send a stimulus from the panel to each fire detector to trigger the respective fire detector;

send a message from each fire detector to the panel in response to the stimulus;

process the message at the panel to trigger a reaction of the panel;

wherein a test of the fire alarm system includes triggering a first set of the plurality fire detectors in two separate modes, first in a recording mode and later in a test mode, wherein the test mode is carried out after a firmware update of the panel;

wherein in recording mode, for each fire detector in the first set, the resulting reaction of the panel is stored in the panel;

after conducting the test mode, for each fire detector in the first set, compare the respective stored reaction and the resulting test mode reaction; and generate an error message at the panel if no match of no sufficient match is determined during the comparison.

7. An apparatus comprising:

a memory storing a set of instructions; and a processing unit configured to function as a panel in a fire alarm system;

wherein the set of instructions, when executed by the processing unit, causes the panel to:

send a stimulus from the panel to each fire detector to trigger the respective fire detector;

send a message from each fire detector to the panel in response to the stimulus;

process the message at the panel to trigger a reaction of the panel;

wherein a test of the fire alarm system includes triggering a first set of the plurality fire detectors in two separate modes, first in a recording mode and later in a test mode, wherein the test mode is carried out after a firmware update of the panel;

wherein in recording mode, for each fire detector in the first set, the resulting reaction of the panel is stored in the panel;

after conducting the test mode, for each fire detector in the first set, compare the respective stored reaction and the resulting test mode reaction; and generate error message at the panel if no match or no sufficient match is determined during the comparison.

* * * * *